(12) United States Patent  
Forman

(10) Patent No.: US 8,856,123 B1
(45) Date of Patent: Oct. 7, 2014

(54) DOCUMENT CLASSIFICATION

(75) Inventor: George Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 529 days.

(21) Appl. No.: 11/780,803

(22) Filed: Jul. 20, 2007

(51) Int. Cl.
*G06F 17/30* (2006.01)

(52) U.S. Cl.
USPC ............................................. 707/737; 706/12

(58) Field of Classification Search
CPC .......... G06F 17/2715; G06F 17/30672; G06F 17/30687; G06F 17/30707; G06F 17/30864
See application file for complete search history.

(56) References Cited

U.S. PATENT DOCUMENTS

| | | | |
|---|---|---|---|
| 6,675,159 B1* | 1/2004 | Lin et al. | 707/3 |
| 6,985,908 B2 | 1/2006 | Nakano | |
| 2005/0108200 A1* | 5/2005 | Meik et al. | 707/3 |
| 2005/0228783 A1* | 10/2005 | Shanahan et al. | 707/3 |
| 2006/0074908 A1* | 4/2006 | Selvaraj et al. | 707/6 |
| 2007/0143101 A1* | 6/2007 | Goutte | 704/9 |
| 2007/0150279 A1* | 6/2007 | Gandhi et al. | 704/258 |

OTHER PUBLICATIONS

Anagnostopoulos et al. "Effective and Efficient Classification on a Search-Engine Model", CIKM'06, Nov. 5-11, 2006.*
Anagnostopoulos, A., Broder, A. Z., and Punera, K. 2006. Effective and efficient classification on a search-engine model. In Proceedings of the 15th ACM international Conference on information and Knowledge Management (Arlington, Virginia, USA, Nov. 6-11, 2006). CIKM '06. ACM Press, New York, NY, 208-217. DOI= http://doi.acm.org/10.1145/1183614.1183648.
Madani, O.; Greiner, W.; Kempe, D.; Salavatipour, M., "Recall Systems: Efficient Learning and Use of Category Indices", International Conference on Artificial Intelligence and Statistics (AISTATS) (2007).

* cited by examiner

*Primary Examiner* — Yuk Ting Choi

(57) ABSTRACT

Provided are, among other things, systems, methods and techniques for classifying a collection of documents. A term is identified based on an indication of ability of the term's presence within a given document to predict whether the given document should be classified into an identified category. A document index is then queried using the identified term and, in response, search results that define a candidate set of documents are received. Finally, a classifier is applied to documents within the candidate set to determine which of the documents should be classified into the identified category.

14 Claims, 3 Drawing Sheets

DOCUMENT CLASSIFICATION

FIELD OF THE INVENTION

The present invention pertains to systems, methods and techniques for classifying documents and is applicable, e.g., to automated systems for classifying text documents into one or more categories.

BACKGROUND

A great deal of attention has been given to automated document-classification techniques. For example, as the volume of digital data has exploded in recent years, there is significant demand for techniques to organize, sort and/or identify such data in a manner that allows it to be useful for a specified purpose.

Automated classification of digital information has application in a number of different practical situations, including text classification (e.g., determining whether a particular e-mail message is spam based on its textual content) and the like. A variety of different techniques for automatically classifying documents exist.

One kind of classification technique uses a supervised classifier, such as Support Vector Machine (SVM) or Naïve Bayes. Generally speaking, supervised classifiers input feature vectors for a number of labeled training samples, i.e., labeled as to whether or not they belong to a category. Then, based on such training information, the classifier generates a function for mapping an arbitrary feature vector into a decision as to whether or not the corresponding document belongs in the category. When a new unlabeled document (or, more specifically, its feature vector) is input, the function is applied to determine whether the document belongs in the category. Unfortunately, the present inventor has discovered that such supervised classifiers often are too slow, particularly when many documents are to be classified.

Another approach that has been suggested is to classify documents by constructing a search-engine query, where the query itself functions as the definition for a particular category; once created, such a query is submitted to the corresponding search engine, and all the returned results are then automatically assigned to the category. See, e.g., A. Anagnostopoulos, et al., "Effective and Efficient Classification on a Search-Engine Model" CIKM'06, Nov. 5-11, 2006, Arlington, Va., USA. While potentially faster than supervised classification techniques, such an approach generally is not as accurate. For example, even the Anagnostopoulos article itself notes that such a technique only achieves 86% or 90% of the accuracy of the best SVM classifier, even under the conditions chosen for the authors' own experiments.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Figure 1:
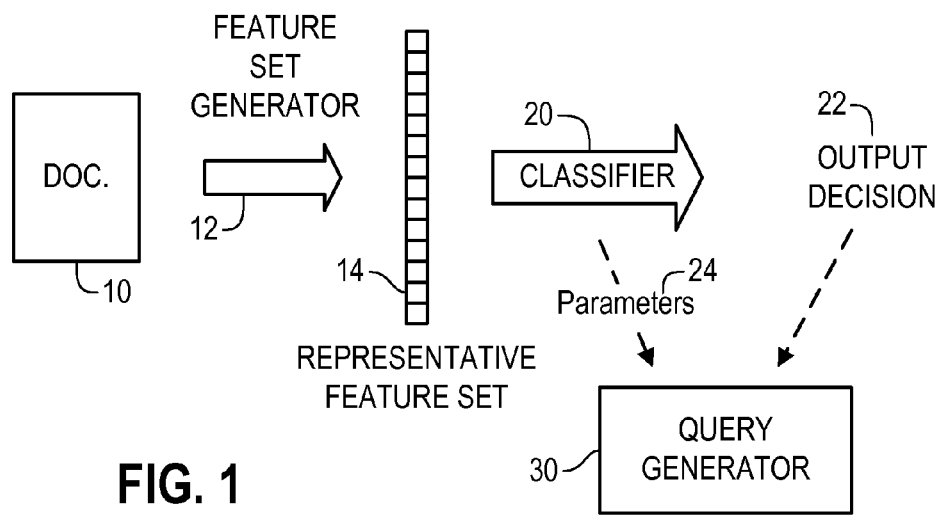
FIG. 1 is a block diagram showing classification of a document and provision of certain results to a query generator.

FIG. 1 is a block diagram showing classification of a document 10 using a supervised classifier 20 and provision of information to a query generator 30. As an initial step, an automated process 12 is first executed in order to generate from the input document 10 a representative feature set 14. Generally speaking, the purpose of process 12 is to generate a representative feature set 14 (often referred to as a feature vector) containing a number of features that are most relevant to the classification problem at hand and, typically, to other related classification problems as well (e.g., so that the same feature set 14 can be used across a number of classification tasks). In other words, the resulting representative feature set 14 can be thought of as a kind of digest of the original document 10 that is optimized for certain automated classification tasks.

The classifier 20 receives representative feature set 14 and processes it using a previously learned classification function in order to output a decision 22 as to whether the document 10 belongs in a particular category. Typically, classifier 20 has an underlying base function, and the learning process involved processing similar representative feature sets for a collection of training documents, each such training document having been assigned a label (usually by someone who is a domain expert) as to whether or not the corresponding document belongs in the subject category. More specifically, the training processing attempts to assign parameters to the underlying function in an attempt to minimize classification errors.

In certain cases, particularly where linear classifiers are used, such parameters include weights for individual features within the feature set. In other cases, the learned functions are more complicated (e.g., as is typically the case for neural-network-based classifiers and other nonlinear classifiers) and/or do not have parameters which can be interpreted in such a straightforward manner.

The foregoing discussion provides a general overview of supervised classifiers, in which a decision is made as to whether to assign an individual item to one or more identified categories based on one or more functions that were derived from labeled training samples. There is a great deal of literature regarding supervised classifiers, and any supervised classifier can be used as classifier 20 in the present invention.

Unlike most conventional techniques, however, in the preferred embodiments of the present invention, either parameters 24 of supervised classifier 20 (such as feature weights) and/or output decisions 22 made by the classifier 20 are provided to a query generator 30. As discussed in more detail below, such information preferably is used by query generator 30 to formulate an index query which is used to reduce the number of documents that are to be classified (by classifier 20 or a different supervised classifier).

Figure 2:
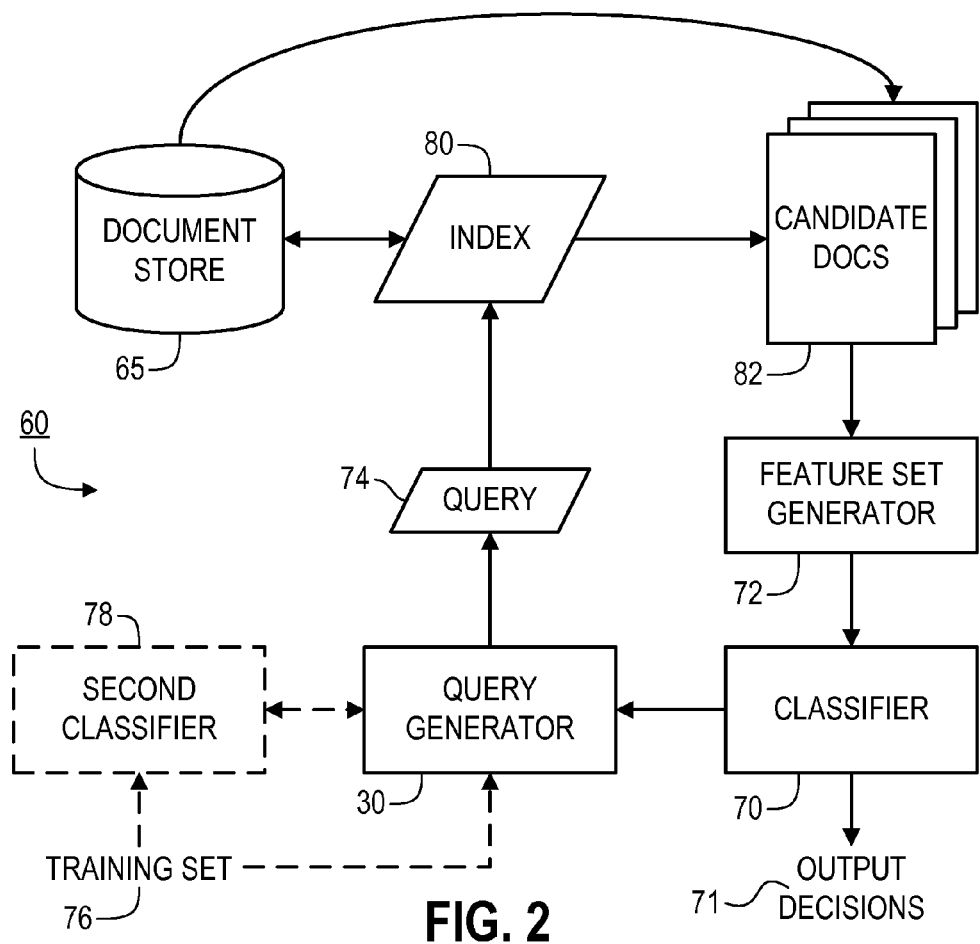
FIG. 2 illustrates a block diagram of a system for classifying a collection of documents using a query against a document index and a separate classifier.

In this regard, FIG. 2 illustrates a block diagram of a system 60 according to certain representative embodiments of the present invention. The main goal of system 60 is to determine which documents within a collection (or store) 65 are to be classified into a particular identified category. Thus, in one representative embodiment all of system 60 can be seen as a binary classification system with a decision of "yes" or "no" to be made for each of the documents within document store

65. However, it should be understood that similar techniques and systems can be applied to other non-binary classification problems as well.

Probably the most common conventional technique for making such classification decisions would be to simply subject each document within document store 65 to a classifier (e.g., classifier 70). The present techniques, in contrast, first perform a screening operation using a query 74 against a document index 80, in order to limit the number of documents that are to be classified by classifier 70. Because the document index 80 is prepared in advance and is not specific to an individual classifier, it often is possible to reduce the amount of processing performed for each new classifier to be applied to the document store 65.

Moreover, such a document index 80 often is already made available by existing systems that provide full-text search support. Preferably, index 80 is an inverted index, such as is commonly used by Windows/Vista indexing, Google Desktop, enterprise Intranet search services, Sharepoint or other Content Management search services, full-web search engines such as Google and Yahoo, and other search engines. Generally speaking, an inverted index is a database listing individual words or other textual terms (e.g., phrases or other multi-word expressions) and, for each such term, the documents (and in some cases, the locations within the documents) where such term appears.

System 60 is particularly advantageous where feature sets are not available for all, or at least a large number of, the documents in document store 65. In such a case, using the present techniques, both the generation of such feature sets 72 (which often is the most time-consuming aspect of a classification task) and the classification itself (using classifier 70) often can be omitted for a large number of documents. In addition, system 60 often is particularly effective where the expected number of positive documents (i.e., the ones that should be assigned to the identified category) is a relatively small fraction of all of the documents within document store 65.

In this regard, it is noted that document store 65 can be any collection of documents, whether existing as an established collection or merely designated (e.g., on-the-fly) as a collection for purposes of the desired classification task. For example, document store 65 might be defined to include all Web pages included within college or university Web sites. In other words, document store 65 can be a conceptual or virtual construct, rather than necessarily corresponding to any existing physical structure or component.

Similarly, the present invention contemplates that the term "document" itself is capable of being flexibly defined, depending upon the needs of the user and/or the nature of the data to be classified. Thus, continuing with the previous example, a user might, e.g., choose to define the "documents" within store 65: as each Web site provided by a college or university, as each Web page within each such site, as each paragraph within each such page, or by dividing text within such sites in any arbitrarily specified manner.

Classifier 70 can be any automated classifier that makes decisions as to whether a particular document should be assigned to an identified category (e.g., whether a particular e-mail message is spam, or whether a particular newspaper article concerns sports) based on a set of information (i.e., a feature set) that has been extracted from the document. For this purpose, an automated feature set generator 72 is used to extract the relevant information from an input document. Although shown as being distinct components in FIG. 2, it should be understood that in certain embodiments feature set generator 72 and classifier 70 are tightly integrated into a single component (e.g., a single software module). In the preferred embodiments, classifier 70 is a supervised classifier, having been trained using labeled training samples.

Generally speaking, query generator 30 produces a query 74 that is designed to retrieve the documents within document store 65 that have a sufficiently high probability of being classified into the category to which classifier 70 pertains, i.e., to filter out documents within document store 65 that are unlikely to receive a "yes" output decision 71 from classifier 70. In the preferred embodiments of the invention, query generator 30 generates the query 74 based on information that has been received from classifier 70. More preferably, if classifier 70 inherently weights particular document features (i.e., indications of the relative importance of different document features), then those weights are provided to query generator 30.

Based on the provided weights, query generator 30 preferably assigns scores to different document features (e.g., different words or other terms within the document). The purpose of each score preferably is twofold. One aspect of each score preferably is to rate the corresponding feature as to how well it distinguishes documents with respect to the ultimate classification decision. In addition, for the reasons described below, it often is desirable to identify features that correspond to as many positive cases as possible. For example, the occurrence of an individual word within a document might be an excellent indication that the document along in the subject category, but the word actually occurs very rarely and therefore can be expected to retrieve only a small number of documents. Accordingly, another aspect of each score preferably is an estimate of the number or percentage of positive cases in which the feature occurs.

In the simplest embodiment, the scores are simply the classification weights themselves (e.g., those provided by classifier 70). However, such weights often do not take account of the second aspect mentioned above, or do not adequately take account of that second aspect. Accordingly, in either such case, some adjustment preferably is made to the raw weights in order to transform them into a score.

For example, in one representative embodiment the score is calculated as $s=fw+(1-f)p$, where s is the score, w is the classification weight, p is the percentage of positive cases in which the feature occurs (or other metric pertaining to frequency of occurrence within the positive cases), and f is an adjustment factor between 0 and 1 inclusive which reflects how much emphasis is placed on the classification weights as compared to the metric pertaining to frequency of occurrence within the positive cases.

In another embodiment, the score is equal to the weight provided that a specified metric pertaining to frequency of occurrence within the positive cases exceeds a specified threshold. Otherwise, the score is equal to zero and the corresponding feature is excluded from the query. In still further embodiments, any other scoring calculation is used, depending upon the nature of the classification weight (if any) and the relative importance of predictiveness versus frequency of occurrence in the particular problem under consideration.

In certain embodiments, weights for the individual features (e.g., terms or words) are not provided by classifier 70. This often will be the case, e.g., where classifier 70 is a nonlinear classifier. In such embodiments, weights and/or scores preferably are identified in these embodiments in any of a variety of different ways, such as any of the following.

In a first embodiment, scores are calculated based on the training set 76 that was used to train classifier 70. Typically, training set 76 will include a number of feature sets (each representing a different document) and a label for each feature set. Based on this information, scores are calculated for the individual features (e.g., within query generator 30) using any of a variety of scoring metrics, such as Information Gain, Chi Squared or signed Bi-Normal Separation (BNS).

In a second embodiment, the training set 76 is provided to train a second classifier 78 that does in fact generate weights for the various features in the feature set (e.g., a linear SVM or Naïve Bayes classifier). Those weights are then provided by the second classifier 78 to the query generator 30 which, in turn, uses them to generate the applicable scores. The preferred implementation of this embodiment is to use feature selection (e.g., an existing feature selection technique) to select a few (e.g., 10 to 200) important features, then to train the second classifier 78 to determine the weights on these features. Thus, it is noted that either or both of classifier 70 and second classifier 78 can correspond to the classifier 20 shown in FIG. 1.

A third embodiment is similar to the first embodiment described above, except that the classifier 70 also provides to query generator 30 a set of feature sets and corresponding decisions (e.g., decisions 22, assuming that classifier 70 in FIG. 2 corresponds to classifier 20 in FIG. 1) that it has made based on those feature sets (e.g., based on actual feature sets, randomly generated feature sets or pseudo-randomly generated feature sets). Query generator 30 then calculates scores for the features based on such information (sometimes referred to herein as a pseudo-training set), either alone or in combination with the actual training set 76.

A fourth embodiment is similar to the second embodiment described above, except that the classifier 70 also provides to the second classifier 78 (e.g., either directly or via query generator 30) a set of features sets and corresponding decisions that it has made based on those feature sets (i.e., a pseudo-training set). Second classifier 78 is then trained on the pseudo-training set, either alone or in combination with the actual training set 76, and provides the resulting weights to query generator 30, which in turn generates the applicable scores based on such information.

In certain embodiments of the invention, the feature sets used by classifier 70 will include features that cannot be searched through the index 80, such as non-textual features and certain textual features that are more complicated than simple existence of a word or term within a document (e.g., existence of a particular term within the Subject line of an e-mail message). In other embodiments, a goal is to create system 60 that is compatible with a wide range of search engines and indexes. In either case, the non-supported features preferably are simply eliminated from consideration by query generator 30.

In any event, the assigned scores preferably are based on an indication of the ability of the term's presence within a given document (e.g., mere presence without any or any significant restriction as to any specific data field and/or other specific location within the document) to predict whether the given document should be classified into the subject category.

An appropriate query 74 preferably is generated in a straightforward manner based on received or identified feature scores. For example, in many cases the feature set indicates whether certain words or other terms (e.g., words, phrases or other combinations of words) occur within the corresponding document, and in the preferred embodiments the score for each word or other term at least indicates how important that term is to the classification, with a high positive value indicating that presence of the term strongly suggests that the document should be classified into the category and with a high negative value indicating that presence of the term strongly suggests that the document should not be classified into the category.

In such a case, and again assuming that only a minority of the documents within document store 65 are likely to be classified into the category, ordinarily the preferred approach is to generate a query 74 which is the logical disjunction of the N terms having the highest positive scores, i.e., $T_1$ OR $T_2$ OR . . . $T_N$, where $T_i$ is the term having the i'th highest positive score.

Conversely, if it is expected that a majority of the documents within document store 65 is likely to be classified into the category, then preferably an assumption is made that all documents within document store 65 are within the subject category unless a decision is made to exclude particular documents, and the preferred approach would be to generate a query 74 which is the logical disjunction of the N terms having the highest negative scores. Of course, either problem can be converted to the other by appropriately defining or redefining the definition of the category. In order to avoid confusion and to simplify the discussion, it is assumed throughout the rest of this disclosure (including the claims) that a "yes" decision or label corresponds to a category into which only a minority of the documents are classified and, therefore, that high positive scores indicate that presence of the feature strongly suggests that the document should be classified into the category.

The choice of N ordinarily will involve a trade-off, with higher values of N often requiring additional retrieval and subsequent processing time and resources, and with lower values of N missing some documents that would have been classified into the category (i.e., reduced recall). Moreover, where there is such sensitivity to the value of N, in certain embodiments the terms selected to include within the query 74 are based not only on raw classification weights, but also on the numbers or percentage of positive documents in which the terms occur. That is, as noted above, even if a given term has a relatively high weight associated with it, it might occur so infrequently as to justify a decision to exclude it from the terms to be included within the query 74.

Fortunately, given the simple word count statistics from the training set 76 (and/or from the previously classified documents) and/or statistics estimated directly from the search engine (e.g., Lucene makes such statistics quickly available at low cost), it is possible to quickly estimate the number of documents that will be retrieved when additional terms are added (when co-occurrence is ignored). For example, a decision to exclude a word that occurred in only 1% of the positive (training and/or pseudo-training) documents is likely to cause no more than 1% loss in recall. If that same word occurred in x % of the negatives and positives together, it is possible to estimate the additional computation and network resources that will be spent or saved by including or excluding the word (again, ignoring co-occurrence).

As a result, an appropriate choice about N, and/or the inclusion or exclusion of individual terms, preferably is made based on the relative cost of additional processing as compared with the additional cost of increased false negatives (loss of recall). In certain embodiments, such costs are input via a user interface for each particular classification problem. Also, as discussed in more detail below, once a query is returned, additional queries can be repeated for the following top-ranked words. Additional considerations pertaining to the formulation of query 74 are discussed in more detail below.

In any event, the generated query 74 is provided to document index 80, which retrieves all of the documents within document store 65 that match the query 74. The individual documents identified by index 80 collectively form a set 82 of candidate documents. In the present embodiment, a feature set is generated by module 72 for each of the candidate documents 82, and that feature set is provided to classifier 70, which makes its output decision 71.

It is noted that system 60 thus provides a filtering mechanism by which only some of the documents within document store 65 are processed in order to generate a feature set, which in turn is then processed by classifier 70. If the query 74 is just a logical disjunction of the terms with the highest positive scores, then by using system 60, as opposed to classifier 70 alone, precision ordinarily will not be adversely affected, at least to any significant degree, because in most cases the resulting query will not filter out a higher percentage of the true positives than the false positives. However, recall is more likely to be negatively impacted because some number of true positives frequently will be filtered out, with the actual number typically depending upon the value of N. For reference, it is noted that Precision=percentage of returned documents that are relevant, i.e. true positives/(true positives+false positives), and Recall=percentage of relevant documents returned, i.e. true positives/(true positives+false negatives).

In alternate embodiments, it is desirable to include within query 74 some terms having negative scores (e.g., the highest negative scores) in order to limit the number of documents in the set of candidate documents 82 that is returned. In this case, the query 74 preferably is modified, e.g., to include, in addition to the logical disjunction of the terms having the highest positive scores, the extra requirement that the identified documents are not include any of the identified term(s) having such negative scores. For example, the query in this case might be stated as: $(T_1 \text{ OR } T_2 \text{ OR } \ldots T_N)$ AND NOT($TN_1$ OR $TN_2$), where $TN_1$ and $TN_2$ are the two terms having the highest negative scores. Besides limiting the size of the set of candidate documents 82 that are processed by modules 70 and 72, inclusion of such terms within query 74 has the potential of reducing the amount of time required to retrieve the matching documents from document store 60. However, including terms having negative scores in this manner carries with it a risk of reduction in recall, meaning that any such decision should be undertaken with care. One embodiment that addresses these opposing considerations is discussed in connection with FIG. 4 below.

Figure 3:
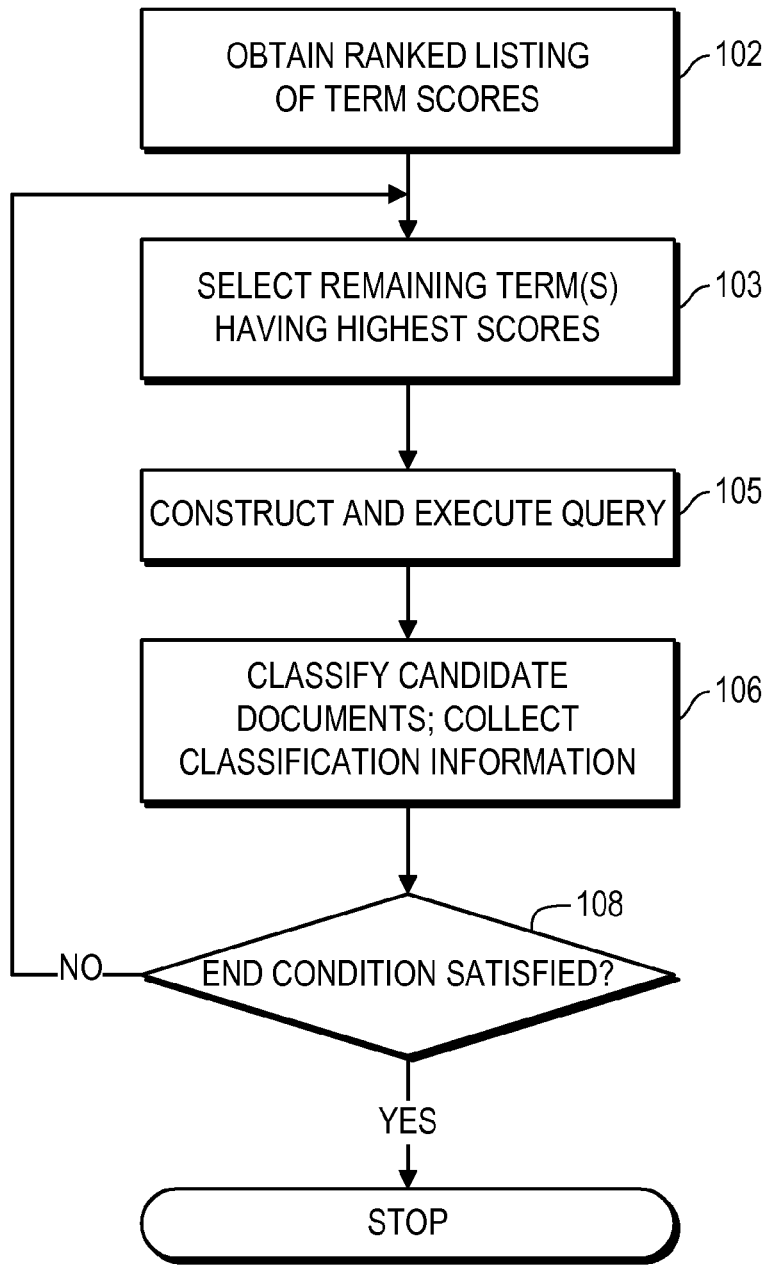
FIG. 3 is a flow diagram illustrating an exemplary technique for classifying a collection of documents.

FIG. 3 is a flow diagram showing one technique for utilizing the system 60 according to a representative of embodiment of the present invention. The method illustrated in FIG. 3 preferably is automated, so that it can be implemented in software or in any of the other ways described herein.

Initially, in step 102 a ranked listing of term scores is obtained. This listing preferably is obtained by sorting the term scores, e.g., which have been obtained in any of the ways described above, based on their values.

Next, in step 103 one or more terms having the highest scores are selected. For purposes of the present embodiment, only the terms having the highest positive scores preferably are selected. In that case, as noted above, using a greater number N of terms increases the number of candidate documents 82 that will be returned and, therefore, the overall amount of time required to perform the classification task, but also tends to increase the recall of system 60.

A simple approach is just to set N to be a constant value, e.g., N=20. Another approach is to attempt to identify an optimal value for N, e.g., one that achieves acceptable balancing between the competing considerations mentioned above. However, it often will be difficult to find such a value at the very beginning of the process, when limited information is available.

Accordingly, the present embodiment uses an incremental approach. For example, at each iteration of step 103, a relatively small number of terms (e.g., 1-10 terms) is selected. Preferably, each such iteration selects the terms having the highest positive scores from among the remaining terms, i.e., the terms that have not previously been selected. The actual number of terms selected in each iteration preferably either is a constant or is decided based on any desired criterion (e.g., a function of term scores and total number of terms selected).

In step 105, a query 74 is constructed (e.g., by module 30) and executed against index 80. The query 74 in this embodiment preferably is the logical disjunction of the terms selected in step 103.

In step 106, the candidate documents 82 that are returned in response to the query 74 are classified by classifier 70 (after having their feature sets generated by module 72). Any of the candidate documents 82 that have been previously classified in an earlier iteration can be simply skipped in the present iteration. While the documents 82 are being classified, information regarding the classifications preferably is collected, such as the number of documents that have been classified and the number of positives identified.

In step 108, a determination is made as to whether a specified end condition has occurred. Depending upon the particular embodiment, this determination is fully automated or based in whole or in part on user input. In the latter case, the information collected in step 106 preferably is automatically summarized and presented to the user, thereby facilitating the user's input.

In one embodiment, the end condition is declared in the event that the percentage of positive decisions falls below a specified threshold. In another, the user is presented with the percentage of positive decisions and/or information (such as a graph) showing the trend across all previous iterations and prompted as to whether or not another iteration should be performed. If the end condition 108 is satisfied, then processing is complete. If not, then processing returns to step 103 in order to select the next group of term(s).

By incrementally processing documents in the foregoing manner, in certain cases it will be possible to better assess the effect of including additional terms on overall efficiency and accuracy, thereby permitting better control. This approach is facilitated by using queries 74 that are simple logical disjunctions of specified terms because each iteration simply has the effect of adding additional terms to the logical disjunction.

Figure 4:
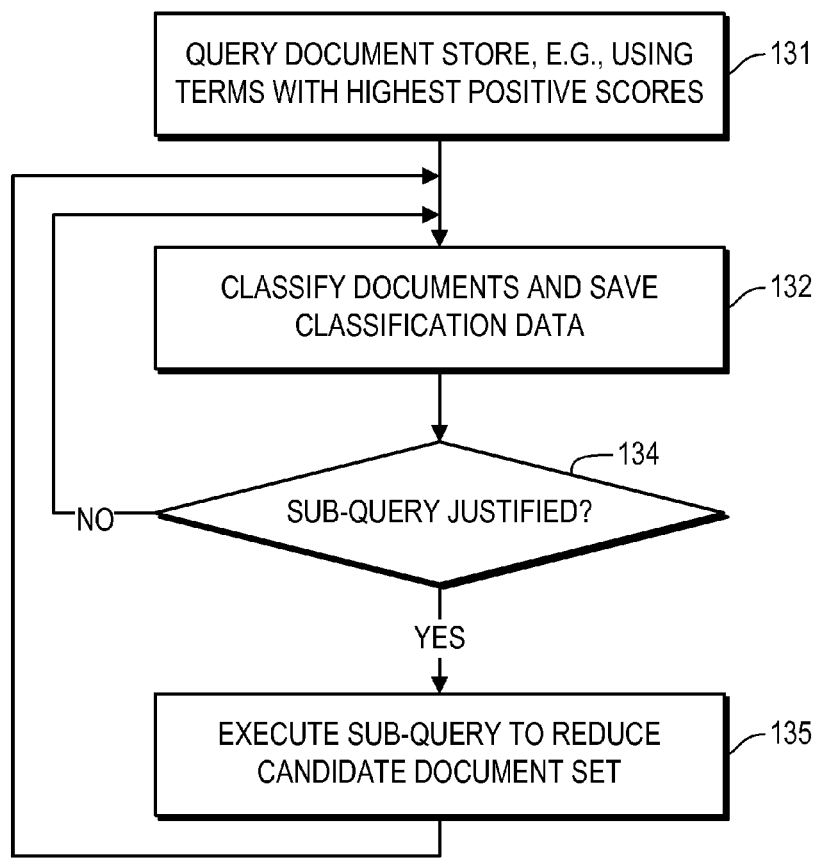
FIG. 4 is a flow diagram of an alternate technique for classifying a collection of documents.

FIG. 4 illustrates a flow diagram of a process for classifying a collection of documents according to another representative embodiment of the present invention. In this embodiment, a set of candidate documents 82 are identified based on a query and then, as the identified documents 82 are classified, additional information is derived which is used to reduce the candidate set of documents 82, thereby also reducing the amount of processing required. As with the other processes and systems described herein, the method illustrated in FIG. 4 preferably is automated, so that it can be implemented in software or in any of the other ways described herein.

Initially, in step 131 the document store 60 is queried by submitting a query 74 to index 80. This step is described above, with the query 74 in the present embodiment preferably being the logical disjunction of a number of the terms having the highest positive scores. More preferably, in the present embodiment of the query 74 is the logical disjunction of 15-20 or more terms. In other words, in the preferred implementations of this embodiment, step 131 cast a relatively wide net with the expectation that the resulting candidate set 82 will be pared down (if possible) during later steps.

In step 132, the identified documents 82 are sequentially processed by using module 72 to generate a feature set and then using module 70 to perform classification. At the same time, as each document is thus classified, classification data (e.g., the resulting feature sets and decisions) preferably are retained for subsequent processing.

In step 134, before all of the identified documents 82 have been processed in step 132, the classification data are analyzed and a decision is made as to whether a sub-query should be executed. Generally speaking, the analysis attempts to identify highly consistent patterns of negative decisions, such as the presence of an individual term or a combination of terms leading to a high percentage of negative decisions over a statistically meaningful sample. For purposes of identifying such patterns, deterministic processing (e.g., specifically testing for individual terms) and/or data-mining techniques (e.g., which attempt to identify even unsuspected patterns) preferably are used. If the percentage of negative decisions corresponding to a particular pattern is high enough (e.g., exceeding a specified threshold, such as one that is based on the overall percentage of positive decisions), then preferably a decision is made that a sub-query is justifiable, and processing proceeds to step 135. Otherwise, processing returns to step 132 to continue the classification processing of the retrieved documents 82.

In step 135, a sub-query is constructed based on the pattern identified in step 134, and that sub-query is executed (e.g., through index 80) against the candidate document set 82. For example, if the determination in step 134 was that the presence of a single term $T_x$ resulted in a significantly high percentage of negative decisions, the sub-query preferably is simply all documents that do not include the term $T_x$, e.g., $NOT(T_x)$. More generally, any logical expression that filters out documents meeting the identified pattern preferably is used.

The foregoing technique often will be able to identify situations in which an initial query against the general database 60 returns documents that not only pertain to the desired category but also pertain to a different category that, e.g., might frequently use one of the same terms as the desired category. For example, assume that one problem is to identify all newspaper articles within a document store 65 that pertain to legal news. The term "court" probably will have a strong association with newspaper articles pertaining to legal news and, therefore, might be included in the initial query 74. However, after processing a number of the candidate documents 82, it might be discovered that documents which included both of the terms "court" and "basketball" exhibit a very high percentage of negative decisions. Accordingly, a sub-query of NOT(basketball) or NOT (basketball AND court) is executed to eliminate those documents from the candidate set 82. While the co-occurrence of "basketball" and "court" across the entire document store 65 might be statistically insignificant, when evaluated within the narrower context of the candidate set 82, the importance of such co-occurrence might become more apparent, thereby justifying the removal of such documents at that point.

In short, the techniques of the present invention often are able to achieve good precision and good control over recall, while simultaneously improving overall processing speed. At the same time, unlike certain conventional techniques, because the present invention uses a separate classifier 70 after generation of the candidate set 82, the present invention often is able to provide an estimate of how good the classification is, at least with respect to the documents within the candidate set 82 (which generally includes all of the documents for which a positive decision has been made).

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method comprising:
   for a given category, receiving a positive set of training documents within the given category and a negative set of training documents not within the given category, by a processor of a computing device;
   using a feature selector on the positive set and the negative set to determine a first set of features that are predictive for the given category, by the processor, each feature comprising a word or a phrase of words;
   training a first classifier from the positive set and the negative set to assign a weight to each feature of the first set of features, by the processor;
   after training the first classifier, querying a document index of a plurality of production documents for each feature of the first set of features to yield a sub-plurality of the production documents that are likely but not necessarily within the given category, by the processor, by formulating a query that includes the first set of features as weighted by the weights thereof to locate the sub-plurality of the production documents, where each of the sub-plurality of the production documents resulting from querying the document index has a total sum of the weights of the first set of features greater than a threshold; and
   applying a second classifier that uses a second set of features greater in number than the first set to determine whether each production document of the sub-plurality is predicted to be within the given category, by the processor,
   wherein the document index is queried to decrease a number of the production documents against which the second classifier is applied to just the sub-plurality of the production documents yielded by querying the document index,
   and wherein the first classifier is one of a Naïve Bayesian classifier, a support vector machine classifier, and a logistic regression classifier.

2. The method of claim 1, further comprising training the second classifier from the positive set and the negative set, by the processor.

3. The method of claim 1, further comprising outputting the production documents of the sub-plurality that are predicted to be within the given category, by the processor.

4. The method of claim 1, wherein the sub-plurality of the documents resulting from querying the document index includes the production documents that contain any of the first set of features.

5. The method of claim 1, wherein some of the sub-plurality of production documents are not within the given category.

6. The method of claim 1, wherein the sub-plurality of production documents is smaller in number than the plurality of production documents.

7. The method of claim 6, wherein the sub-plurality of production documents that are within the given category is smaller in number than a total number of the sub-plurality of production documents.

8. A non-transitory machine-readable medium storing machine-executable process steps for classifying a collection of documents, said process steps comprising:
   for a given category, receiving a positive set of training documents within the given category and a negative set of training documents not within the given category;
   using a feature selector on the positive set and the negative set to determine a first set of features that are predictive for the given category, each feature comprising a word or a phrase of words;
   training a first classifier from the positive set and the negative set to assign a weight to each feature of the first set of features;
   after training the first classifier, querying a document index of a plurality of production documents for each feature of the first set of features to yield a sub-plurality of the production documents that are likely but not necessarily within the given category, by formulating a query that includes the first set of features as weighted by the weights thereof to locate the sub-plurality of the production documents, where each of the sub-plurality of the production documents resulting from querying the document index has a total sum of the weights of the first set of features greater than a threshold; and
   applying a second classifier that uses a second set of features greater in number than the first set to determine whether each production document of the sub-plurality is predicted to be within the given category,
   wherein the document index is queried to decrease a number of the production documents against which the second classifier is applied to just the sub-plurality of the production documents yielded by querying the document index, and wherein the first classifier is one of a Naïve Bayesian classifier, a support vector machine classifier, and a logistic regression classifier.

9. The non-transitory machine-readable medium of claim 8, wherein said process steps further comprise training the second classifier from the positive set and the negative set.

10. The non-transitory machine-readable medium of claim 8, wherein said process steps further comprise outputting the production documents of the sub-plurality that are predicted to be within the given category.

11. The non-transitory machine-readable medium of claim 8, wherein the sub-plurality of the documents resulting from querying the document index includes the production documents that contain any of the first set of features.

12. The non-transitory machine-readable medium of claim 8, wherein some of the sub-plurality of production documents are not within the given category.

13. The non-transitory machine-readable medium of claim 8, wherein the sub-plurality of production documents is smaller in number than the plurality of production documents.

14. The non-transitory machine-readable medium of claim 13, wherein the sub-plurality of production documents that are within the given category is smaller in number than a total number of the sub-plurality of production documents.

* * * * *